United States Patent Office 3,767,605
Patented Oct. 23, 1973

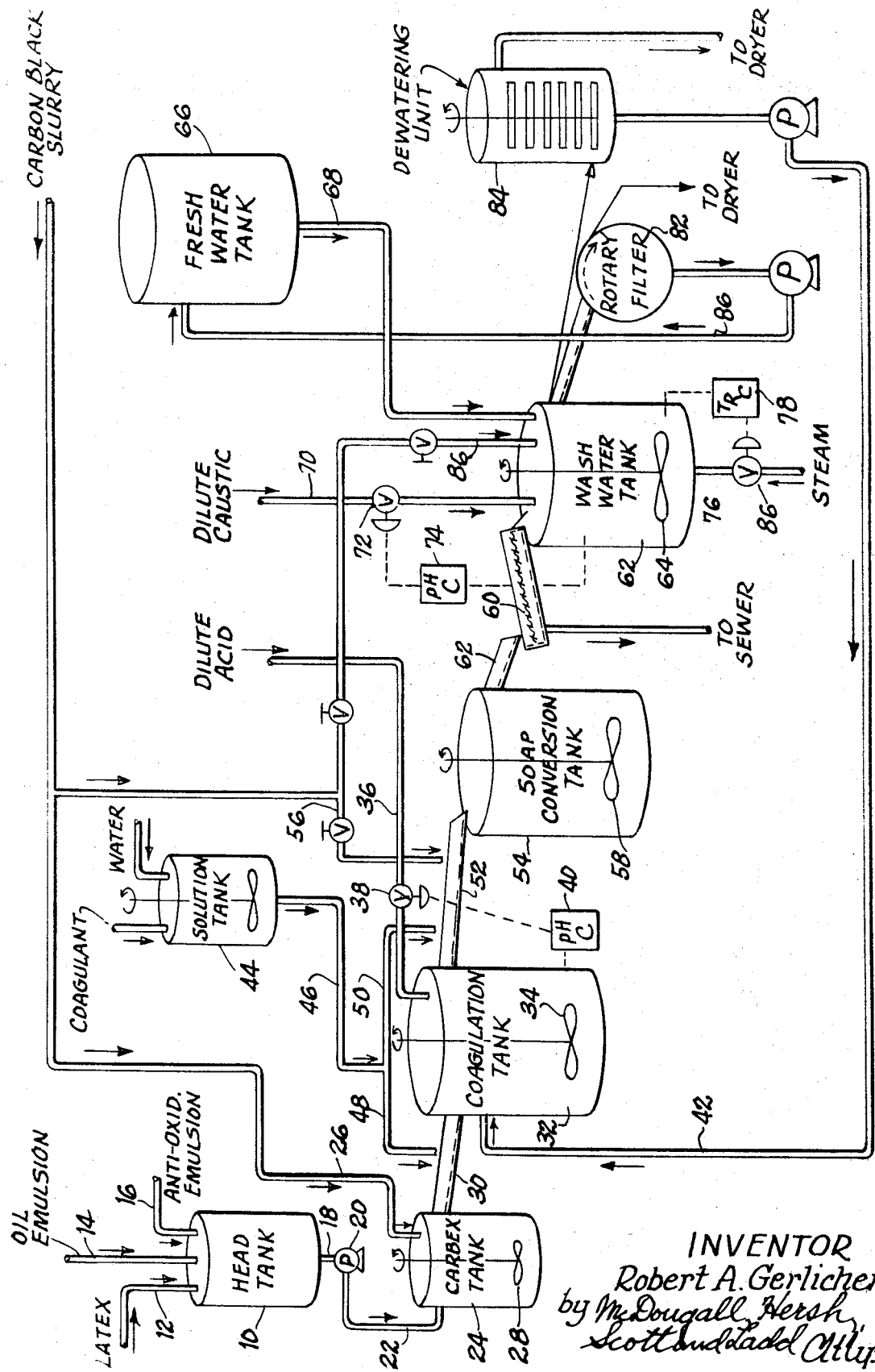

3,767,605
METHOD FOR PREPARATION OF RUBBER CRUMB
Robert A. Gerlicher, Baton Rouge, La., assignor to Copolymer Rubber & Chemical Corporation, Baton Rouge, La.
Filed Aug. 13, 1969, Ser. No. 849,713
Int. Cl. C08c *11/72*
U.S. Cl. 260—23.7 A
18 Claims

ABSTRACT OF THE DISCLOSURE

The preparation of rubber crumb preferably in the form of black masterbatch crumb in which the latex is coagulated during a first coagulation step to produce the rubber crumb and a serum which contains some uncoagulated polymeric material which subsequently coagulates to form a rubber layer on the surface of the crumb and in which carbon black is introduced subsequent to coagulation to be taken up with the rubber layer that is formed during coagulation of the uncoagulated polymeric material remaining in the serum to produce a less tacky crumb and which includes the modifications wherein in addition to or separate and apart from the carbon black, additions can be made of salts, oxides and carbonates of metals capable of reaction to form a soap with the organic acids remaining in the crumb and which includes the further modification of treating the surface of the crumb with a low molecular weight alcohol or low melting point paraffin during the elevated temperature water washing step to take up carbon black or other compounds described in a layer formed on the surface of the crumb.

---

This invention relates to the manufacture of polymers of elastomeric materials and more particularly to the manufacture of masterbatch crumb of less tackiness and improved physical properties.

It is an object of this invention to produce and to provide a method for producing an elastomeric (rubber) crumb and particularly black masterbatch crumb having reduced tackiness to permit more efficient handling in processing equipment and to improve the physical properties of elastomeric material and products fabricated thereof.

These and other objects and advantages of this invention will hereinafter appear and, for purposes of illustration, but not of limitation, an embodiment of the invention is shown in the accompanying drawing in the form of a flow diagram of a portion of the manufacturing process embodying the features of this invention.

The invention is addressed to the manufacture of rubber crumb from latices of natural or synthetic rubbers. When the latex is a synthetic rubber latex, it may be any suitable latex prepared by prior art processes wherein a polymerizable monomeric material or a mixture of polymerizable monomeric materials is emulsified in aqueous medium by means of an emulsifying agent, such as a soap, rosin soap or other suitable surface active agent, and the polymerization made to take place at a suitably controlled temperature in the presence of a catalyst and/or other regulating material. The primary emulsifier preferably should be a material that is unstable at low pH, such as a long chain fatty acid soap as represented by sodium or potassium oleate or stearate, the rosin soaps or mixtures thereof. The polymerization of the monomer is generally short-stopped at a desirable stage short of complete conversion, such as at above 60% and preferably 65–70% conversion, and the unreacted monomer or monomers removed by conventional flashing and/or stripping before introducing the formed latex to a head tank. As is well understood in the art, it is also advantageous, in the preparation of certain synthetic rubber latices, such as SBR (styrene-butadiene latices) to carry out the polymerization in a cold polymerization at low temperature, such as at about 41° F. The polymerization may be carried out at higher temperature, such as up to 122° F., when preparing SBR latices by a prior art hot rubber process.

Examples of polymerizable materials useful in preparing synthetic rubber latices are the various 1,3-butadienes such as 1,3-butadiene, methyl-2-butadiene-1,3-piperylene, and 2,3-dimethyl-butadiene-1,3. If desired, the polymerizable material may be a mixture of a 1,3-butadiene, such as 1,3-butadiene itself with another polymerizable compound which is capable of forming rubbery copolymers with the 1,3-butadienes. For example, such polymerizable mixtures may contain up to 50% (or higher in some instances) of a compound which contains a $CH_2=C=$ group wherein at least one of the disconnected valences is attached to an electro-active group, i.e., a group which substantially increases the electrical dissymmetry or polar character of the molecule. Examples of compounds containing the aforementioned group and copolymerizable with the 1,3-butadienes are aryl olefins, such as styrene and vinyl naphthalene; the alpha methylene carboxylic acids, and their esters, nitriles and amides, such as acrylic acid, methyl acrylate, methyl methacrylate, acrylonitrile, methacrylonitrile and methacrylamide; isobutylene, methyl vinyl ethers; and methyl vinyl ketone. The foregoing polymerizable substances or mixtures are examples of materials that may be used in the preperation of rubbery polymer latices and solid rubbery polymers which along with natural rubber and polychloroprene, may be referred to herein as homopolymers of conjugated diolefins and copolymers of conjugated diolefins and ethylenically unsaturated monomers. The preferred rubbery polymer or latex is prepared from a polymerizable material which is a mixture of butadiene and styrene wherein the styrene content of the mixture, by weight, is less than about 50%. However, any suitable butadiene-styrene synthetic rubber or latex may be used in practicing the present invention.

As used herein, the term "rubber" is meant to include natural rubber and such synthetic rubbers as above described.

A typical recipe in parts by weight for preparing a butadiene-styrene synthetic rubber latex by a "cold rubber" process is given below in Table I.

TABLE I

| | |
|---|---|
| Butadiene | 100–50. |
| Styrene | 0–50. |
| Primary emulsifier [1] | 1.5–5.0 |
| Electrolyte [2] | 0.2–1.5 |
| Secondary emulsifier [3] | 0–0.12 |
| Ethylenediamine tetraacetic acid tetrasodium salt [4] (in soap solution) | 0.–0.10 |
| Sodium hydrosulfite | 0.0.10 |
| Water | 150–250 |
| Sodium formaldehyde sulfoxylate | 0.04–0.20 |
| Diisopropyldibenzene hydroperoxide or paramenthane hdyroperoxide | 0.03–0.30 |
| Tertiarydodecylmercaptan | 0–0.3 |
| Ferrous sulfate heptahydrate | 0.02–0.04 |
| Versene 100 tetrasodium salt of ethylene diamine tetraacetic acid to complex ferrous sulfate | 0.03–0.06 |
| Shortstop [5] | 0.05–0.20 |

[1] The primary emulsifier may be a long chain fatty acid soap such as sodium or potassium oleate or stearate, the rosin soaps, or mixtures thereof.
[2] The following electrolytes or mixtures may be used: Potassium chloride, sodium chloride, trisodium phosphate, tripotassium phosphate, potassium pyrophosphate, potassium sulfate, sodium sulfate, sodium borate and lithium chloride. The preferred electrolyte is 0.3 part by weight of trisodium phosphate.
[3] Tamol N. Daxad 11. Nycol (polymerized sodium salts of alkyl naphthalene sulfonic acid).
[4] Sold as Versene 100, a product of Dow Chemical Company; Sequestrene 30A, a product of Alrose Chemical Company; Nullapon BF–13, a product of Antara Chemicals.
[5] A 50/50 mixture of sodium dimethyl dithio carbamate and sodium polysulfide.

In current practice, the rubbery polymer latex is fed at a predetermined rate into a head tank along with an aqueous carbon black slurry, oil-water emulsion (when an oil extender or oil blender rubber is being produced) and an antioxidant. The various ingredients, introduced continuously at controlled rates into the head tank, are agitated for flow as a homogeneous mixture, generally referred to as carbex, to a coagulation tank. In the event that it is not desired to produce an oil extended rubbery polymer, the oil emulsion feed to the head tank can be eliminated.

Coagulant is introduced with the carbex to a coagulation tank at a rate depending somewhat upon whether coagulation is to be carried out by a first partial coagulation of 5–80% of the rubber polymer and preferably 20–40%, followed by a coagulation of the remainder at a later stage, as described in U.S. Pat. No. 3,272,768, or whether coagulation is to be carried out substantially completely in a single step, as described in U.S. Pat. No. 3,005,856, both patents being incorporated herein by reference for the preparation of the latices and their coagulation to form black masterbatch crumb.

As used herein, use can be made of any suitable coagulant well known in the art, such as alum, but it is preferred to make use of a fresh aqueous mineral acid solution having a pH of about 1.0 to 2.5 and preferably about 1.7. While any suitable mineral acid, such as sulfuric acid, hydrochloric acid, phosphoric acid and the like, may be used, it is preferred to make use of a dilute sulfuric acid solution. Other coagulants including organic acids, such as acetic acid, may be used, or use can be made of carbonic acid such as generated by bubbling carbon dioxide directly under the carbex. For partial coagulation, satisfactory results can be secured at a pH between 4.0 and 6.5 and preferably within the range of 4.5 to 5.5, while complete coagulation is effected at a pH maintained within the range of 1.7 to 5.0 and preferably at a pH of about 3.0.

Upon coagulation, the polymer forms into particles, referred to as crumb, suspended in an aqueous serum. The mixture of crumb and serum is mixed with a secondary emulsifier deactivator solution such as diethylenetriamine, and preferably an aqueous solution of Polyamine H, representing still bottoms obtained in the preparation of diethylenetriamine comprising a mixture of ethylene amines boiling above tetra-ethylenepentamine, e.g. pentaethylene hexamine and hexaethylene-heptamine, and because of its viscous and sticky nature it is blended with diethylenetriamine to facilitate handling, and various other amine compounds, such as Nalco 107, glue and other suitable prior art materials suitable for the purpose.

The secondary emulsifier deactivator is about 0.125 percent by weight of Nalco 107 solution which is added at a rate of about 3–5 gallons per minute to the mixture of serum and crumb flowing through a soap conversion tank. However, the best method of control is the visual observation, with the emulsifier deactivating solution being added in amounts sufficient to give a serum which is substantially clear, thereby to indicate essentially complete coagulation of the remaining latex.

The mixture is then passed over a dewatering screen to separate the crumb from the serum and the separated crumb is introduced into a wash tank wherein it is washed with fresh water introduced at a controlled rate. Recycle water removed from the crumb in subsequent screening equipment is added to the fresh water stream for this secondary operation. A small amount of base may be added to the wash water to neutralize free mineral acid. The material is fed from the wash water tank onto a rotary vacuum screen for removal of free water to produce a rubbery crumb containing 40–50% water on the wet basis which is subsequently subjected to a drying operation.

It has been found that some uncoagulated latex remains to cause a milky serum after coagulation in the coagulation tank. Even when use is made of a coagulation aid, which is added to the stream flowing from the coagulation tank and to the discharge from the coagulation tank to effect coagulation of the last traces of rubber in the milky serum, the resulting coagulation of the remainder of polymer is not instantaneous. Instead, coagulation of the last traces of the polymer from the serum appears to be a gradual reaction which is completed in the soap conversion tank. The final coagulation which takes place after the main body of polymer has been coagulated to form the black masterbatch crumb deposits as a thin layer of tacky coagulated rubber, which is free of carbon black, on the surfaces of the freshly formed crumb. The relatively pure rubber film is sticky with the result that numerous problems are encountered during subsequent processing of the crumb, such as build up of sticky crumb on the walls of the coagulation tank, soap conversion tank, troughs and pH electrodes. Difficulties are encountered in processing the crumb through the dewatering, washing, crumb disintegration, crumb transport and dryer sections, as by means of a fluidized bed, and filter plugging and difficulties in drying, packaging, and the like are encountered.

In instances where low Mooney rubber is being produced, the crumb is difficult to wash before drying because of the agglomeration of the crumb into well matted, dense clumps on dewatering equipment.

It is difficult to remove occluded mineral acids, even with wash water adjusted to a pH of 7.2 to 7.5 by the addition of caustic, with the result that vulcanizates having poor electrical properties are produced and the cure rate as well as modulus values are also reduced.

It has been found that the difficulties heretofore encountered can be overcome and a rubber crumb can be prepared which is characterized by less surface tackiness, better drying properties, and which permits the production of rubber products having improved physicals when the foregoing process is modified to introduce a small amount of carbon black slurry to the coagulating tank mixture and/or to the discharge from the coagulation tank whereby carbon black is made available to be taken up with the last traces of the polymer coagulated from the serum to form a thin layer on the previously formed crumb.

The carbon black adhered to the rubber layer deposited on the porous crumb not only results in a less tacky crumb surface, but the crumb is made more homogeneous in composition with respect to the content of carbon black throughout the cross-section of the crumb. In addition, the described system permits the use of wash water at a lower pH so that organic acid losses can be minimized.

Without the addition of carbon black to be taken up with the film formed on the surfaces of the crumb, a dense rubber coat is secured which makes it difficult to dry the crumb. With the carbon black in the layer on the surface thereof, a more porous crumb is secured in which the drying characteristics and rate are greatly improved.

The amount of carbon black slurry introduced to the coagulation tank and/or to the effluent from the coagulation tank will vary somewhat, depending upon the type of rubber produced. For example, with a low Mooney rubber which is polymerized in the presence of rosin soaps, the rubber layer deposited on the crumb has a higher carbon black holding capacity so that more carbon black can be diverted for addition at this stage of the process. However, it is undesirable to add carbon black in an amount in excess of that capable of being retained by the layer or surface, as measured by the freedom of carbon black in the mother liquor screened off from the crumb subsequent to soap conversion. Generally it will be sufficient if the amount of carbon black introduced subsequent to coagulation corresponds to an amount within the range of 0.01–7% of the total carbon black formulated into the black masterbatch crumb and preferably in an amount within the range of 0.1–5% of the total.

Having set forth the basic concepts of the invention, illustration will now be made of the practice of this invention by reference to the accompanying drawing which picks up the process for synthesis of an SBR rubber at the head tank 10 into which the latex, at 18–20% solids, is introduced through line 12 at a rate within the range of 50–100 g.p.m. (gallons per minute), when producing 12 to 3000 pounds per hour of dry product. Extender oil, when formulated into the rubbery polymer, is introduced as an emulsion containing about 60% solids, through line 14 at a rate of 1–12 g.p.m. and the antioxidant, such as beta-phenyl naphthalene, BLE (a condensation product of acetone and diphenyl aniline), is introduced as a water emulsion containing 8% solids through line 16 at a rate of 3 to 12 pounds per minute.

The mixture, dispensed through the bottom of the head tank 10 through line 18, is creamed by means of a creaming pump 20 and advanced through line 22 to a carbex tank 24 for admixture with a carbon black slurry, as a 4–5% suspension, fed through line 26 at a rate of 100–210 g.p.m. in an amount to provide the desired ratio of carbon black to rubber in the carbex. The carbex tank 24 is provided with an agitator in the form of a stirrer 28 to maintain the materials in uniform admixture.

The resulting carbex that is formed in the carbex tank may contain for each 100 parts by weight rubbery polymer, 1 to 105 parts by weight carbon black, 0 to 105 parts by weight processing oil and 0.5 to 3.5 parts by weight of antioxidant, and preferably about 50 parts by weight carbon black, 10 parts by weight processing oil and 1.25 parts by weight antioxidant.

The carbex overflows tank 24 for flow through trough 30 to a coagulation tank 32 which is also provided with an agitator in the form of a stirrer 34.

Dilute sulfuric acid (about 5% $H_2SO_4$) is fed through line 36 into the coagulation tank at a rate of about 5–7 g.p.m. to provide for adjustment of the pH of the mixture to within the range of 2.5 to 3.3. The rate of flow of the acid solution is regulated by a control valve 38 in line 36 which is controlled by a pH controller regulator 40 which measures the pH of the mixture in the tank. The coagulation tank is also fed with wet, fine crumb and any free carbon black along with serum which is recycled through line 42 from the dewatering system to seed crumb formation.

A coagulation aid, such as a high molecular weight polyamine, as represented by Nalco 107 or Polyamine H, is fed from a solution tank 44 through line 46, at a concentration of about 0.125% with one portion being introduced at a rate of about 0.25 g.p.m. through line 48 to the carbex flowing through trough 30 in advance of the coagulation tank while another portion is added through line 50, at a rate of about 1–5 g.p.m., to the mixture overflowing the coagulation tank 32 for flow through trough 52 to the soap conversion tank 54.

In the coagulation tank, a first main coagulation of polymer takes place almost instantaneously upon the admixture with the acid. The crumb that is formed contains rubber, free organic acids, carbon black, oil, antioxidant and a small amount of soap. Free latex remains in the serum to form a serum which is milky in appearance.

Carbon black suspension can be added to the coagulation tank to be taken up with the latex which subsequently separates from the serum to deposit as a layer of coagulated rubber on the surfaces of the crumb.

In the preferred practice of this invention, carbon black slurry is added in a concentration of about 4–5% through line 56 at rate of about 1–5 g.p.m. to the effluent overflowing the coagulation tank for passage through trough 52 to the soap conversion tank 54, preferably with the further addition of coagulation aid to clear up rubber from the serum.

The second stage of coagulation takes place in the soap conversion tank which is fitted with an agitator, such as a stirrer 58, and wherein the material remains over a residence time sufficient to convert any soap to organic acid. This is accompanied with a slow reaction to coagulate residual latex from the serum which takes up free carbon black that is present, in accordance with the practice of this invention, to produce a porous, relatively non-tacky layer or surface.

In the preferred practice of this invention, use is made of the type of carbon black slurry being used for the production of the carbon black masterbatch because this simplifies the process. For example, if a carbon black identified commercially as HAF is incorporated in the product, the carbon black slurry side stream used to coat the rubber crumb surface would be the HAF type of carbon black. However, practice of the invention is not limited to the use of the same carbon black since other commercially available carbon blacks can be used. For example, use can be made of a carbon black-water slurry containing a carbon black identified commercially as ISAF for surface coating a crumb containing the carbon black identified commercially as SRF carbon black. An HAF carbon black slurry can be used to coat an SRF carbon black containing crumb. Smaller quantities of the coating carbon black slurries are necessary when the smaller particle size ISAF carbon black is used as compared to the SRF type carbon black which has a larger particle size.

The solid crumb is separated from the mother liquor as by means of a vibratory screen 60 fed with the overflow from the soap conversion tank 54 via the trough 62. The crumb, which separates out on the surface of the screen, is delivered to a wash water tank 62 fitted with a stirrer 64. The crumb, still containing about 40–50% by weight water, calculated on the wet basis, is introduced into the wash tank along with fresh water from fresh water tank 66 through pipe 68 at a rate of about 125 g.p.m. A 5% caustic solution is introduced through line 70 at a rate of about 0.25 to 0.5 g.p.m. to maintain the pH in the wash tank at about 7.5 to 8.0 and preferably about 7.6. For this purpose, the line 70 is provided with a flow control valve 72 which is regulated in response to a pH recorder 74 having its pH probe extending into the wash water tank 62.

The materials in the wash tank are heated to an elevated temperature, such as to about 150° F., whereby the rubber coating on the crumb becomes softened to facilitate the take-up of carbon black which may remain in the system and to improve the drying rate. For this purpose, the wash tank is provided with an inlet 76 at the bottom through which steam is introduced. The amount of steam is regulated by the temperature recorder controller 78 which regulates a flow control valve 80 in the steam line.

The material from the wash water tank 62 is then processed to effect the removal of the major amount of free water, after which the separated crumb is dried for packaging and shipment. In the illustrated modification, the major amount of water is removed either by first processing the material from the wash tank over a rotary filter 82, after which the wet crumb containing about 40–50% water is advanced for drying by a flight dryer or in a fluid bed dryer, as described in the copending application Ser. No. 767,250, filed Oct. 14, 1968, and entitled "Means and Method for Drying Wet Elastomeric Crumb," now U.S. Pat. No. 3,525,162 or by processing the material from the wash water tank through a Carter-Day dewatering unit 84 to produce a wet crumb which can be subsequently dried by a flight dryer or a fluid bed dryer as described.

The water separated at the rotary filter 82 can be recycled through line 86 at a rate of about 65 g.p.m. to the fresh water tank 66 for use as water for washing the crumb.

By way of modification, in addition to the introduction of carbon black slurry following coagulation by flow into trough 52, part of the carbon black slurry may be introduced into the wash water tank 62 through line 86, with the carbon black slurry containing carbon black in a concentration of 4–5% and introduced into the wash water tank at a rate of about 0–10 g.p.m.

It will be found that build up to sticky rubber on the walls of the processing units as well as on the temperature and pH measuring devices will be greatly reduced and that plugging of the vibratory screen will be less frequent when the process is carried out in accordance with the process of the invention.

It will be observed that the agglomeration of crumb is greatly reduced and that a more effective wash can be secured with the non-agglomerated crumb. Drying from the porous surface of the crumb is more rapid and the crumb that is formed is capable of being handled and processed with considerably less difficulty than before.

It will be understood that the foregoing example is given by way of illustration of the practice of the inventive concepts and that considerable variation may exist with respect to the particular rubber system, the ratio of carbon black, oil, antioxidant or coagulation aid, without departing from the concepts of the invention.

The following is typical of the further variation in composition of an oil extended SBR rubber with which the invention may be practiced, given in parts per 100 parts of rubber:

|  | Low | High |
| --- | --- | --- |
| Oil | 5 | 62.5 |
| Carbon black | 40 | 82.5 |
| Antioxidant (staining) | 0.6 | 0.75 |
| Antioxidant (non-staining) | 1.5 | 1.5 |

The following further example is typical of the flow conditions in the illustrated process for the production of an SBR rubber containing 83 parts carbon black and 65 parts oil per 100 parts by weight of rubber at a production rate of 14,000 pounds per hour dry rubber.

Latex is introduced into the head tank at a solids of 18–20% at a rate of 50 g.p.m. Oil is introduced as a 60% emulsion at a rate of 12.5 g.p.m., and antioxidant is introduced as an 8% emulsion at a rate of 6 pounds, 10 ounces per minute.

Carbon black is introduced into the carbex tank at a rate of 73.4 pounds per minute and coagulation aid (Nalco 107) is introduced in a concentration of 0.125 to the trough leading into the coagulation tank at a rate of one quart per minute. Coagulation aid is introduced to the trough leading into the soap conversion tank at a rate of 3 g.p.m.

In a further ramification of the invention, in the event that a sufficiently tack-free crumb is not produced by the practice of the described concepts, the invention contemplates the further addition to the wash water tank or to the effluent from the coagulation tank of a small amount of an oxide or carbonate of metals of the Group I and preferably Group II of the periodic system. Best use is made of the addition of calcium, magnesium or zinc oxide or mixtures thereof at a pH of 7.0 to 8.0 to the materials introduced into the wash water tank for reaction with organic acids on the surface of the crumb to form the corresponding water insoluble soaps. The formed soaps contribute lubricity while reducing the tendency for the crumb to stick or agglomerate. For this purpose, use can also be made of the oxide or carbonate of lithium.

When it is desired to achieve deeper penetration into the crumb to provide a non-sticky crumb exterior, use can be made of a water soluble salt or mixture of salts of the aforementioned metals or mixtures of such water soluble salts with slightly water soluble salts of the metals, or mixtures of such water soluble or slightly soluble salts with carbon black slurries.

If it is desirable to lower the modulus values of the vulcanized rubber product that is formed, use can be made of the salts of aluminum for improving lubricity and reducing tackiness.

In the modification which makes use of such oxides, carbonates and salts of the aforementioned metals, significant improvements can be achieved when such materials are employed in an amount within the range of 0.01–0.5% by weight of the rubber and preferably in an amount of about 0.2% by weight of the rubber.

In addition to the incorporation of such metal oxides, carbonates or salts into the wash tank or effluent from the coagulation tank, improvements in lubricity and reduction of tackiness can be achieved by sprinkling such materials in dry powder form onto the surfaces of the dewatered crumb prior to drying. When use is made of such powdered materials, the metal compounds may be substituted in whole or in part with silica dust, chalk, ground glass, and the like.

The foregoing treatment of the formed crumb with the oxide or carbonate of lithium, calcium, zinc, magnesium or aluminum has beneficial effect to reduce tackiness and agglomeration when employed in the current process without the addition of carbon black to the coagulation tank and/or the wash water tank and after agglomeration but before the soap conversion tank.

When organic acids are not present or completely washed from the crumbs, the stearates or other fatty acid soaps of the metal can be incorporated into the wash water for imparting the desired lubricity and non-tackiness to the crumb surfaces.

In cases where a suitable non-tacky rubber crumb cannot be realized, the crumb can be coated with a light layer of an inert material which will not saponify in the hot wash water tank but which will melt and have an affinity for the insoluble pigments such as carbon black or the magnesium, calcium, zinc, lithium, or aluminum oxides or carbonates at the 150° F. wash temperature. For this purpose, use can be made of materials such as high molecular weight alcohols or low melting point paraffins. Such materials would be in liquid state on the crumb surface at the temperature conditions existing in the wash tank. It is believed that the liquefied layer is capable of taking up and holding more carbon black or others of the above mentioned pigments which are added as a dilute water suspension to the wash tank.

The organic materials can be added to the hot water wash tank before addition of the slurry of carbon black or other pigment or all of the ingredients can be added simultaneously and continuously to the wash water tank. The added surface pick-up of carbon black or other pigment particles gives more protection and less loss during subsequent dewatering, drying and other crumb handling equipment.

To achieve the desired effect from the addition of such organic fluidized coating materials, it is desirable to make use of such materials in an amount within the range of 0.01–5% by weight of the rubber and preferably in an amount of about 0.2% by weight.

It will be apparent from the foregoing that I have provided a new and improved procedure in the manufacture of rubber crumb and particularly black masterbatch crumb wherein the adhesions and agglomerations previously experienced can be substantially completely eliminated with the production of a rubber crumb capable of producing vulcanizates having improved and mechanical properties.

It will be understood that changes may be made in the details of composition and conditions of operation without departing from the spirit of the invention, especially as defined in the following claims.

I claim:

1. In the preparation of black masterbatch from a latex of natural and synthetic rubber polymeric material based on polymers of 1,3-butadiene in which the latex is admixed with coagulant, a coagulation aid and carbon black slurry, coagulating the rubber material to form a crumb with the carbon black leaving a serum containing a small amount of uncoagulated rubber polymeric material in a first coagulation step, converting soap present in the crumb to the corresponding organic acid during a residence time in a second coagulation step wherein uncoagulated polymeric material remaining in the serum coagulates to form a rubber layer on the crumb, separating the serum to yield a wet crumb, adding wash water and caustic to the wet crumb in a water washing step, dewatering the washed crumb and drying the crumb, the improvement comprising adding carbon black to the serum containing the coagulated crumb whereby carbon black is taken up with the layer of rubber formed on the surface of the crumb from the uncoagulated polymeric material during the second coagulation step.

2. The preparation as claimed in claim 1 in which the amount of carbon black added during or subsequent to coagulation represents 0.01–7% by weight of the total carbon black in the black masterbatch.

3. The preparation as claimed in claim 1 in which the carbon black is added after the first coagulation step but before the second coagulation step.

4. The preparation as claimed in claim 1 in which the carbon black is added both during the first coagulation step and again before the second coagulation step.

5. The preparation as claimed in claim 1 in which the carbon black is added before and during the wash water step.

6. The preparation as claimed in claim 1 in which the carbon black is added before the second coagulation step and before or during the wash water step.

7. The preparation as claimed in claim 1 which includes the addition of a high molecular weight alcohol or a low melting point paraffin in the wash water step to adhere carbon black to the surfaces of the washed crumb.

8. The preparation as claimed in claim 7 in which the alcohol or paraffin is added in an amount within the range of 0.01–0.5% by weight of the rubber crumb.

9. The preparation as claimed in claim 1 in which coagulation aid is added before the second coagulation step.

10. The preparation as claimed in claim 1 in which the crumb and wash water is heated to an elevated temperature during the wash water step.

11. The preparation as claimed in claim 10 in which the materials are heated to a temperature of about 150° F. during the wash water step.

12. In the preparation of black masterbatch from a latex of natural and synthetic rubber polymeric materials based on polymers of 1,3-butadiene in which the latex is admixed with coagulant, a coagulation aid and carbon black slurry, coagulating the rubber material to form a crumb with the carbon black leaving a serum containing a small amonut of uncoagulated rubber polymeric material in a first coagulation step, converting soap present in the crumb to the corresponding organic acid during a residence time in a second coagulation step wherein uncoagulated polymeric material remaining in the serum coagulates to form a rubber layer on the crumb, separating the serum to yield a wet crumb, adding wash water and caustic to the wet crumb in a water washing step, dewatering the washed crumb and drying the crumb, the improvement comprising adding carbon black to the serum containing the coagulated crumb whereby carbon black is taken up with the layer of rubber formed on the surface of the crumb from the uncoagulated material during the second coagulation step and contacting the resulting crumb between the second coagulation step and the washing water step with a material which is taken up with the layer of rubber formed on the surfaces of the crumb to reduce tackiness of the surfaces of the rubber layer on the crumb, said material being selected from the group consisting of a salt, an oxide and a carbonate of a metal selected from the group consisting of a Group I metal, a Group II metal and aluminum, a high molecular weight alcohol, a low-melting paraffin and mixtures thereof.

13. The preparation as claimed in claim 12 in which carbon black is introduced in addition in the water washing step.

14. The preparation as claimed in claim 12 in which the carbon black is introduced in the coagulation step and again beyond the coagulation step but before the acid conversion step.

15. The preparation as claimed in claim 12 in which the amount of carbon black added to the crumb is within the range of 0.01–7% by weight of the total carbon black of the black masterbatch.

16. The preparation as claimed in claim 12 in which the material is added in the water washing step of the formed crumb.

17. The preparation as claimed in claim 12 in which the material is employed in an amount within the range of 0.01–0.5% by weight of the rubber crumb.

18. The preparation as claimed in claim 12 in which the material is a salt, oxide or carbonate selected from the group consisting of lithium, zinc, calcium, magnesium and aluminum.

References Cited

UNITED STATES PATENTS

| 3,055,856 | 9/1962 | Sutherland | 260—41.5 |
| 3,112,288 | 11/1963 | Davis et al. | 260—33.6 |
| 3,272,768 | 9/1966 | Sutherland et al. | 260—27 |

DONALD E. CZAJA, Primary Examiner
W. E. PARKER, Assistant Examiner

U.S. Cl. X.R.

260—33.6 AD, 41.5 MP, 29.7, 763